Figure 1:
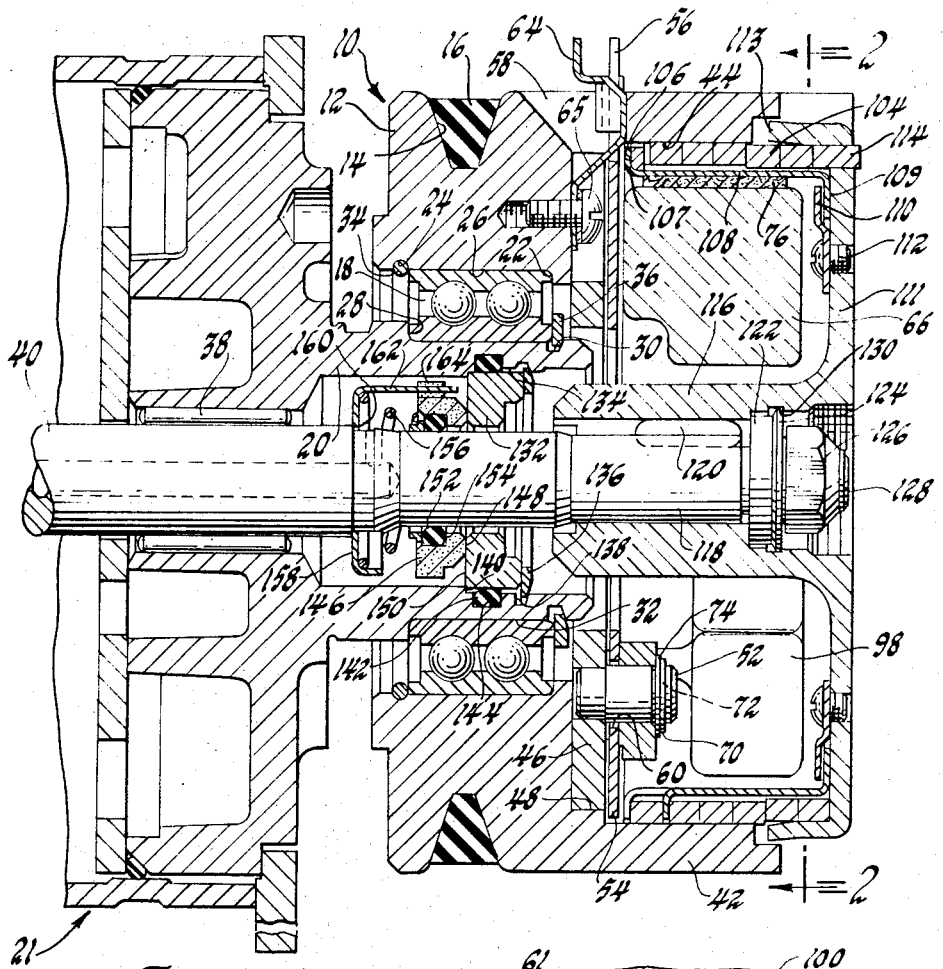

United States Patent [19]

Briar

[11] 3,727,738

[45] Apr. 17, 1973

[54] CENTRIFUGALLY ENGAGED COIL CLUTCH WITH WEIGHT LOCK

[75] Inventor: John R. Briar, Dayton, Ohio

[73] Assignee: General Motors Corporation, Detroit, Mich.

[22] Filed: Feb. 9, 1972

[21] Appl. No.: 224,769

[52] U.S. Cl............192/105 CE, 192/35, 192/114 R, 192/77, 308/187.1
[51] Int. Cl.................................................F16d 43/14
[58] Field of Search....................192/105 CE, 103 B, 192/35, 114 R, 81 C, 77

[56] References Cited

UNITED STATES PATENTS

| | | | |
|---|---|---|---|
| 1,204,392 | 11/1916 | Bartmess | 192/105 CE |
| 1,826,054 | 10/1931 | Chryst | 192/105 CE |
| 2,360,124 | 10/1944 | Greenlee | 192/105 CD |

FOREIGN PATENTS OR APPLICATIONS 787,230   9/1935   France..............................192/103 B

*Primary Examiner*—Benjamin W. Wyche
*Attorney*—Warren E. Finken et al.

[57] ABSTRACT

The centrifugally actuated spring clutch illustrated includes two pairs of alternately positioned centrifugal weight members, one pair of which, under the action of centrifugal force, frictionally engages an energizing cup attached to a coil-wound torque spring for effecting the driving of an output shaft. The second pair of weight members abuts respective adjacent actuating weight members to supplement the force thereof and to thus serve as torque-multipliers therefor, enabling heavy torque loads to be driven by a relatively compact clutch assembly. A lock plate may be manually moved to lock both pairs of weights in an inoperative position.

6 Claims, 2 Drawing Figures

CENTRIFUGALLY ENGAGED COIL CLUTCH WITH WEIGHT LOCK

This invention relates generally to clutches and, more particularly, to centrifugally actuated spring clutches for use with automotive air compressors.

When air-conditioning is employed on a vehicle, it is preferred that the compressor not be a load on the engine starter at engine start-up, but rather that the compressor be actuated automatically at a predetermined rpm to drive a predetermined load. It is also desirable that the centrifugal clutch used for such an application be as compact as possible.

Accordingly, a general object of the invention is to provide improved compact centrifugal weight means for engaging and expanding a coil-wound torque spring to interconnect a drive pulley and an output shaft once the engine reaches a predetermined rpm during engine start-up, and to become disengaged at a predetermined lower rpm.

Another object of the invention is to provide an improved centrifugal clutch including a compact centrifugal weight cluster which is adaptable to a relatively small clutch housing and assembly, while being suitable for efficiently driving substantially heavy torque loads.

A further object of the invention is to provide an improved centrifugally actuated spring clutch including actuating weight members and additional cooperating torque-multiplier weight members.

Figure 2:
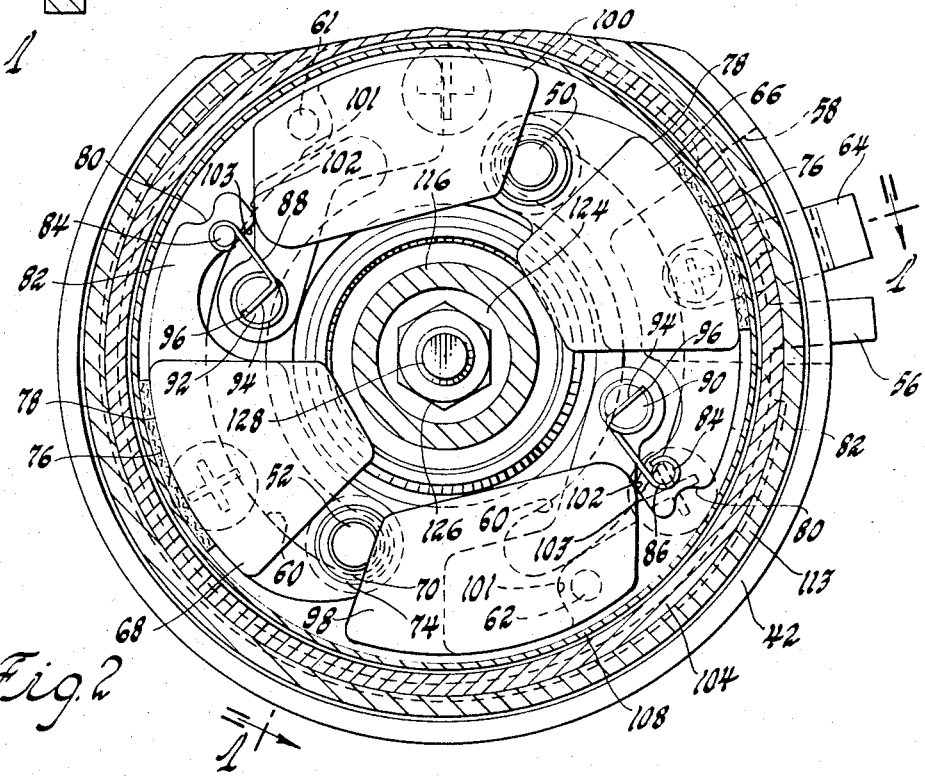

These and other objects and advantages of the invention will become apparent when reference is made to the following description and accompanying drawings, wherein:

FIG. 1 is a cross-sectional view of a centrifugal clutch embodying the invention, taken along the plane of line 1—1 of FIG. 2, and looking in the direction of the arrows; and FIG. 2 is a cross-sectional view taken along the plane of line 2—2 of FIG. 1, as if FIG. 1 were a full-round view, and looking in the direction of the arrows.

Referring now to the drawings in greater detail, FIG. 1 illustrates a centrifugal clutch assembly 10 including a cast iron cylindrical housing 12 having a pulley groove 14 formed therein. A drive belt 16 is mounted in the groove 14. The housing 12 is mounted on bearings 18 which, in turn, are mounted around a fixed sleeve member 20, which may extend from an air-conditioning compressor 21. A first shoulder 22 and a first groove 24 are formed adjacent opposite ends of the inner peripheal surface 26 of the housing 12, while a second shoulder 28 and a second groove 30 are formed on the outer peripheral surface 32 of the sleeve member 20. A snap ring 34 is mounted in the groove 24, and a retainer ring 36 is mounted in the groove 30, the shoulders 22 and 28 and the rings 34 and 36 serving to retain the housing 12 and the sleeve member 20 in axial alignment with one another on the bearings 18. The sleeve member 20 is mounted on needle bearings 38 around a compressor shaft 40 which extends through the center of the centrifugal clutch 10 to the compressor 21.

A cylindrical extension 42 is formed on the housing 12 and has a counterbored surface 44 formed therein. A steel back-up plate member 46 is mounted in a recess 48 formed in the bottom of the counterbored surface 44 and is secured therein by a plurality of screws (not shown) threadedly mounted in suitable threaded openings formed in the housing 12. A pair of oppositely disposed pivot pins 50 and 52 (FIG. 2) are secured to the plate member 46.

An additonal plate member 54 (FIG. 1) is mounted around the shaft 40 adjacent the back-up plate member 46. A lever arm 56 is secured by any suitable means to the plate member 54 and extends radially outwardly therefrom through a circumferentially slotted opening 58 formed 1n the cylindrical extension 42 of the pulley housing 12. Arcuate slots 60 are formed in the plate member 54 to accommodate the extension therethrough of the two pivot pins 50 and 52. A pair of oppositely disposed pins 61 and 62 are secured to the plate member 54, as illustrated in FIG. 2. A contoured retainer clip 64, secured to the pulley housing 12 by bolts 65, serves to retain the lever arm 56 either in the upper or lower (FIG. 2) portions of the slotted opening 58, depending upon the operative position selected.

A pair of weight members 66 and 68 are pivotally mounted adjacent the plate member 54 on the pivot pins 50 and 52, respectively, and retained thereon by retaining rings 70 mounted in grooves 72 formed adjacent the ends of the pivot pins 50 and 52. A spacer or bearing washer 74 is mounted on each pivot pin 50 and 52 intermediate the respective retaining rings 70 and the adjacent faces of the weight members 66 and 68. Each of the weight members 66 and 68 includes a shoe 76 of a suitable friction material bonded or secured in any other suitable manner to the outermost arcuate-shaped surface 78 thereof.

A notch-like groove or cam surface 80 is formed adjacent an end portion of an arcuate-shaped extension portion 82 of each weight member 66 and 68. A pin 84 is mounted on each extension portion 82 adjacent each groove 80. Spring or wire members 86 and 88 are each secured at one end thereof to each pin 84 and secured at the other ends thereof to respective oppositely disposed pins 90 and 92 fixed on the plate member 46. A straight end portion 94 formed on each wire member 86 and 88 is mounted in a slot 96 formed in each pin 90 and 92. The central portion of each spring is curved or otherwise shaped so as to permit portion 82 to pivot outwardly from pin 92.

A second pair of generally arcuate-shaped weight members 98 and 100 are secured to the pins 90 and 92, respectively, intermediate the adjacent weight members 66 and 68. A notched portion 101 is formed in each weight member 98 and 100 to avoid contact with the pins 61 and 62 on the plate member 54. It may be noted in FIG. 2 that surfaces 102 and 103 on the weight members 98/100 and 82, respectively, are substantially in contact with one another.

A coil-wound torque spring 104 is mounted within the counterbored surface 44 of the cylindrical extension 42 of the pulley housing 12, with the inner end face 106 thereof secured to an outwardly extending flange 107 formed on an annular wall or energizing cup 108 mounted around the weight members 66, 68, 98, and 100. The flange 107 is positioned slightly apart from the adjacent face of the plate member 54, just inside the outer edge thereof. An inwardly extending flange 109 is formed on the outer end of the energizing cup 108 and is retained axially by a guide 110 secured to a conector plate or end cover member 111 by screws 112.

The cover member 111 includes an outer cylindrical wall portion 113 which surrounds and is operatively connected to an outer extended end tab 114 of the coil-wound torque spring 104 and is rotatable therewith. The cover member 111 also includes a hub portion 116 which is secured to an end portion 118 of the compressor shaft 40 by means of a key 120. The hub portion 116 is retained in place on the shaft-end portion 118 by a washer 122, a retainer ring 124 and a nut 126 threadedly mounted on the threaded end 128 of the compressor shaft 40, the retainer ring 124 being mounted in a groove 130 formed in the hub portion 116 to axially position the torque spring 104 relative to the pulley housing 12 and the shaft 40.

A seat member 132 is mounted in a recess 134 formed in the inner end of the sleeve member 20. A retainer ring 136, mounted in an annular groove 138 formed on the inner peripheral surface of the sleeve member 20, retains the seat member 132 fixed in position against a shoulder 140 formed on the inner surface of the sleeve member 20. An O-ring seal 142 is mounted in an annular groove 144 also formed in the inner peripheral surface of the sleeve member 20 adjacent the outer surface of the fixed seat member 132. A carbon ring 146 is mounted around the compressor shaft 40 with its end face 148 slidably mounted against the adjacent face 150 of the fixed seat member 132. An O-ring seal 152 abuts against a shoulder 154 formed on the inner surface of the carbon ring 146 to prevent leakage around the compressor shaft 40. A compressed spring 156 abuts against a retainer member 158 which is secured against a shoulder 160 formed on the compressor shaft 40, and urges the O-ring seal 152 against the shoulder 154, retaining the carbon ring 146 in contact with the face 150 of the fixed seat member 132. An axially extending finger 162 extends from the retainer member 158, to the right in FIG. 1, adjacent a projection 164 formed on the carbon ring 146 to effectuate the rotation of the carbon ring 146 with the shaft 40.

OPERATION

Referring now to FIG. 2, it may be noted that if the lever arm 56 were positioned in its uppermost or so-called "winter" position in the slotted opening 58, and retained there by the retainer clip 64, the pins 61 and 62 would be positioned in the notches or cam surfaces 80 adjacent the ends of the extension portions 82 of the weight members 66 and 68, respectively, thus serving to retain the weight members 66 and 68 in their radially innermost positions. This is the so-called "winter" or "nonrunning" position when it is desirable that the compressor 21 be inoperative. In this position the weight members 66 and 68 are prevented from responding to the action of centrifugal force and, hence, the compressor shaft 40 will remain stationary. The weight members 98 and 100 are also prevented from responding to the action of centrifugal force by virtue of the contact between adjacent surfaces 102 and 103 of the members 98/100 and 82, respectively, while the members 82 are retained by the pins 61 and 62.

When it is desired to have the compressor 21 become operative, i.e., once warm weather arrives, the lever arm 56 is moved into the lowermost or "summer" position in the slotted opening 58, as illustrated in FIG. 2. Since the pivot pins 50 and 52 are secured to the fixed back-up plate 46, the arcuate slots 60 formed in the plate member 54 permit the plate 54 to be rotated relative thereto without interference from the pivot pins 50 and 52. It may be noted that the pins 61 and 62, which are secured to the plate member 54, are thus rotated in a clockwise direction out of the respective cam surfaces or notches 80 and extension portions 82 as a result of the movement of the lever arm 56. This permits the weight members 66 and 68 to be pivoted outwardly under the action of centrifugal force about the pivot pins 50 and 52, against the force of the respective spring members 86 and 88.

Once the weight members 66 and 68 have pivoted outwardly under the action of centrifugal force of a predetermined engine speed of, say, 300 rpm, the shoes 76 will frictionally engage the energizing cup 108. Since the latter is engaged at its end flange 107 to the inner end face 106 of the coil-wound torque spring 104, the torque spring 104 will be forced outwardly into contact with the inner surface 44 of the pulley housing 12. This causes the torque spring 104, as well as the cover member 111, which is contacted by the end tab 114 of the spring 104, to begin to rotate along with the pulley housing 12. Inasmuch as the cover member 111 includes the hub portion 116 and the latter, in turn, is keyed to the compressor shaft 40 by the key 120, rotation of the cover member 111 will rotate the compressor shaft 40 accordingly and thus actuate the compressor 21. Full driving engagement will have been attained at approximately engine "idle," say, 600 rpm.

To accommodate substantially large compressor 21 torque loads, without resorting to a larger centrifugal clutch arrangement, the engaging force of the shoes 76 against the energizing cup 108 as a result of the action of centrifugal force on the weight members 66 and 68 is supplemented by the outward movement of the weight members 98 and 100 under the action of centrifugal force, as a result of the contact between the adjacent surfaces 102 and 103 of the adjacent respective weight members 98/100 and extension 82.

Once the engine speed has reduced to a predetermined level, say, 50 rpm, the springs 86 and 88 will return the extensions 82 inwardly, thus returning the respective weight members 66/98 and 68/100 to their nondriving positions.

It should be apparent that the invention provides improved compact centrifugal clutch means for efficiently driving substantially heavy torque loads at a predetermined engine operating speed and to disengage same at a predetermined lower engine speed.

While but one embodiment of the invention has been shown and described, other modifications thereof are possible.

I claim:

1. A centrifugal clutch arrangement comprising a cylindrical housing, a pulley groove formed on the outer periphery of said cylindrical housing, an output shaft, bearing means for rotatably mounting said cylindrical housing at one end thereof on said output shaft, a coil-wound torque spring loosely mounted within the inner periphery of the other end of said cylindrical housing, connector means secured between the outer end of said torque spring and said output shaft, a first pair of oppositely disposed weight members pivotally connected to said cylindrical housing radially within said coilcwound torque spring for causing the expansion of said coil-wound torque spring into contact with said cylindrical housing to be driven thereby, and a second pair of oppositely disposed weight members positioned alternately with said first pair of weight members for respectively abutting against said first pair of weight members to supplement the engaging force thereof.

2. A centrifugal clutch arrangement comprising a cylindrical housing, a pulley groove formed on the outer periphery of said cylindrical housing, an output shaft, bearing means for rotatably mounting said cylindrical housing on said output shaft, a recess formed in one end of said cylindrical housing, a coil-wound torque spring mounted within the inner periphery of said recess with a narrow clearance therebetween while said torque spring remains in an unstressed condition, connector means secured between the outer end of said torque spring and said output shaft, a first pair of oppositely disposed weight members pivotally mounted on the bottom surface of said recess radially within said coil-wound torque spring, an annular wall member mounted intermediate said first pair of weight members and said torque spring and connected to the inner end of said torque spring, said first pair of weight members contacting said annular wall member under the action of centrifugal force to cause said turque spring to expand to engage the adjacent wall of said recess, and a second pair of oppositely disposed weight members positioned alternately with said first pair of weight members for respectively abutting against said first pair of weight members to supplement the engaging force thereof.

3. The centrifugal clutch arrangement described in claim 2, and manually actuated means operatively mounted in said cylindrical housing for rendering said weight members inoperative under the action of centrifugal force.

4. The centrifugal clutch arrangement described in claim 3, and a cam suface formed adjacent the free end of each of said first pair of weight members, and wherein said manually actuated means includes a plate member rotatably mounted intermediate said bearing means and the ajacent faces of said weight members, a pair of oppositely disposed pin members formed on said plate member, and lever means on said plate member for manually rotating said plate member to move said pin members into contact with said respective cam surfaces on said first pair of weight members, thereby rendering said first and second pairs of weight members inoperative under the action of centrifugal force.

5. A centrifugal clutch arrangement comprising a cylindrical housing, a pulley groove formed on the outer periphery of said cylindrical housing, an output shaft, bearing means for rotatably mounting said cylindrical housing on said output shaft, a counterbore formed in one end of said cylindrical housing, a coil-wound torque spring mounted within the inner periphery of said counterbore, an annular wall member mounted within the inner periphery of said coil-wound torque spring and secured to the innermost end thereof, a cover member secured between the outermost end of said torque spring and an end portion of said output shaft, first and second pairs of oppositely disposed pivot pins fixed on the bottom surface of said counterbore, first and second pairs of weight members circumferentially aligned and pivotally mounted on said respective first and second pairs of pivot pins radially within said annular wall member, a friction shoe mounted on the radially outer surface of each of said first pair of weight members, a first contacting surface formed on each of said first pair of weight members adjacent the respective free ends thereof, a second contacting surface formed on each of said second pair of weight members adjacent the respective pivotal ends thereof, said friction shoes contacting said annular wall member under the action of centrifugal force on said first pair of weight members and causing said torque spring to expand and engage said inner periphery of said cylindrical housing at a predetermined engaging force, thereby driving said output shaft via said cover member, said predetermined engaging force being supplemented by the pressure of said second contacting surfaces of said second pair of weight members against said first contacting surfaces of said first pair of weight members under the action of centrifugal force, and spring means connected between said free ends of said first pair of weight members and said second pair of fixed pivot pins for returning said first and second pairs of weight members to their rspective radially inner non-driving positions once centrifugal force has subsided to a predetermined level.

6. The centrifugal clutch arrangement described in claim 5, and a cam surface formed on the radially outer surface of each of said first pair of weight members adjacent the free ends thereof, a plate member rotatably mounted intermediate said bottom surface of said counterbore and the adjacent faces of said weight members, a pair of arcuate slots formed in said plate member for mounting around each of said first and second pairs of oppositely disposed pivot pins, a pair of oppositely disposed fixed pin members formed on said plate member, lever means on said plate member for manually rotating said plate member to move said fixed pin members into contact with said respective cam surfaces, thereby rendering all of said weight members inoperative under the action of centrifugal force, and retainer clip for retaining said plate member in position once manually rotated.

* * * * *